Nov. 14, 1944. E. C. LEE 2,362,963
BARRIER JOINT OR TERMINATION FOR ELECTRIC POWER CABLES
Filed May 15, 1941 2 Sheets-Sheet 1
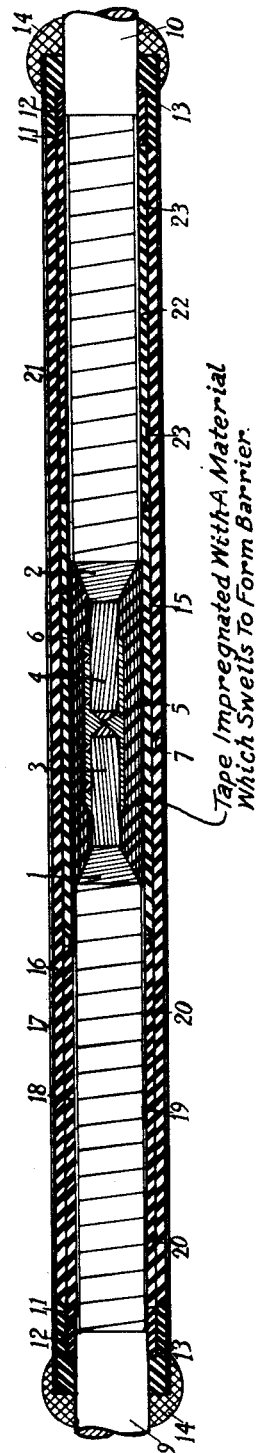
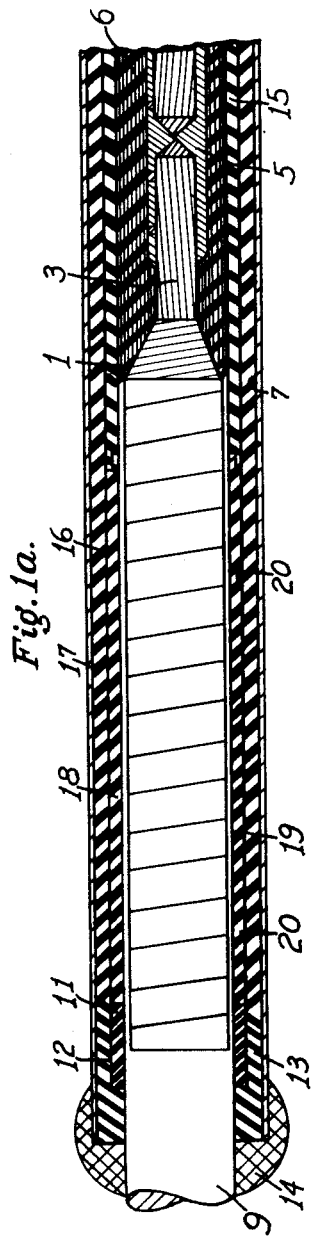
INVENTOR
E. C. Lee
BY
ATTORNEY Nov. 14, 1944.   E. C. LEE   2,362,963
BARRIER JOINT OR TERMINATION FOR ELECTRIC POWER CABLES
Filed May 15, 1941   2 Sheets-Sheet 2

INVENTOR
E. C. Lee
BY
ATTORNEY

Patented Nov. 14, 1944

2,362,963

UNITED STATES PATENT OFFICE 2,362,963

BARRIER JOINT OR TERMINATION FOR ELECTRIC POWER CABLES

Edwin Charles Lee, London, England, assignor to International Standard Electric Corporation, New York, N. Y.

Application May 15, 1941, Serial No. 393,564
In Great Britain June 25, 1940

8 Claims. (Cl. 174—23)

The present invention relates to electric cables and more particularly to the preparation of barriers for preventing the flow of insulating compound between sections of power cables which are insulated by paper tape impregnated with oil or similar insulating compound; or for preventing the flow of insulating compound from a terminal section of such cable and a hollow porcelain insulator, transformer or switchgear chamber at which the cable terminates.

One object of the invention is to bond the insulating material of the barrier to the cable conductor in order to prevent the formation of vacuous spaces (or voids) between said material and said conductor which might cause breakdown under electrical stress.

According to the invention, a method of forming a barrier in an electric power cable comprises painting a conductor core with a lapping of insulating tape to form a barrier of built-up insulation having a uniform diameter which is substantially equal to the internal diameter of a preformed sleeve, coating the built-up insulation with a lacquer, which has the property of causing said insulation to swell, and then applying said preformed sleeve into close contact with the built-up insulation so that said insulation upon swelling will tightly engage said sleeve.

Also according to the invention, a method of forming a barrier joint between two sections of an electric power cable, comprises building up a body of insulation around the joint by successive layers of tape consisting of or impregnated with rubber or rubber styrene until it has a uniform diameter which is substantially equal to the internal diameter of a preformed sleeve, coating the built-up insulation with a solvent for the rubber or rubber styrene, and then driving said preformed sleeve over the built-up insulation so that said insulation upon swelling will tightly engage said sleeve.

Further according to the invention, a method of forming a barrier termination in an electric power cable comprises joining a conductor of the cable to a ferrule, building up a body of insulation around the end of the ferrule adjacent to said conductor, said conductor and the adjacent cable insulation, by successive layers of tape consisting of or impregnated with rubber or rubber styrene until it has a uniform diameter which is substantially equal to the internal diameter of a pre-formed sleeve, coating the built-up insulation with a solvent for the rubber or rubber-styrene, and then driving said preformed sleeve over the built-up insulation so that said insulation upon swelling will tightly engage said sleeve.

Embodiments of the invention will now be described by way of example, reference being made to the accompanying drawings comprising Figs. 1–3.

Fig. 1 shows a barrier joint according to the invention applied to a power cable insulated with impregnated fibrous tape;

Fig. 1A is an enlarged view of slightly more than the left half of the joint illustrated in Fig. 1.

Figure 2:
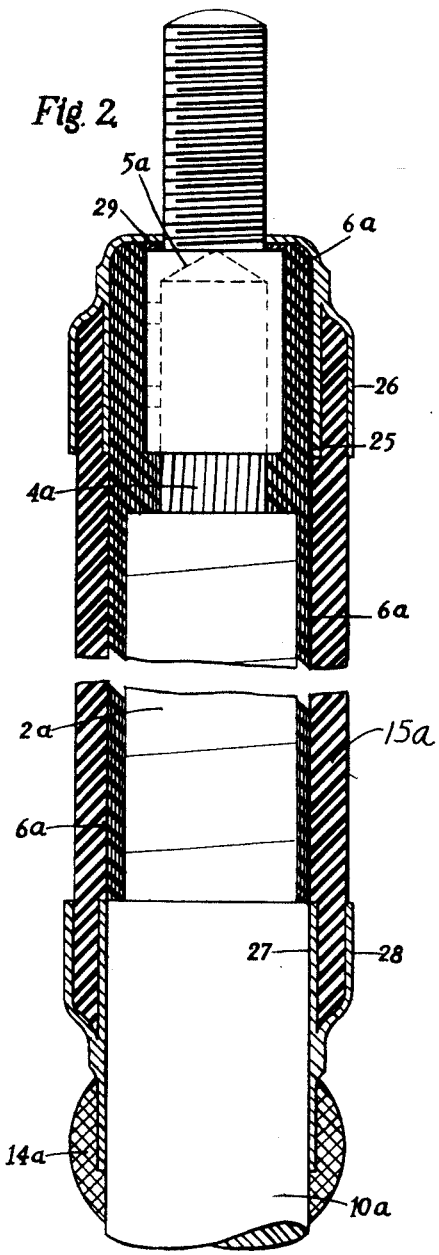
Figs. 2 and 3 show a barrier termination according to the invention applied to a power cable insulated with impregnated fibrous tape.

A description will now be given with reference to Figs. 1 and 1A of a method of preparing a barrier joint between two lengths of electric power cable which are insulated by paper tape impregnated with oil or other insulating compound.

The lead sheaths 9, 10, of the two cable ends are stripped back for the required lengths and the impregnated paper tapes 1, 2 are then stripped back to expose the conductor core ends 3, 4 and tapered as shown. A preformed inner cylindrical sleeve 15 of bonded styrenated paper having a somewhat greater internal diameter than the external diameter of the paper insulation 1, 2 is slipped over one of the cable ends. An outer cylindrical sleeve 16 of bonded styrenated paper cemented into a copper sleeve 17 by cement 7 and forming a close fit over the inner cylindrical sleeve 15 is passed over the other cable end and slipped out of the way over the lead sheath. The core ends 3, 4 are then united mechanically and electrically by means of a metal ferrule 5. Any free oil is wiped from the surfaces of 1, 2, 3, 4 and 5 which are then painted with a suitable lacquer, e. g. a lacquer consisting of polystyrene dissolved in monostyrene, with or without the addition of a suitable plasticiser. The surfaces of 1, 2, 3, 4 and 5 are then lapped with insulating tape to form built-up insulation 6 having a uniform diameter which is substantially equal to the internal diameter of the sleeve 15 so as to form a tight fit therein. The tape used to form the built-up insulation 6 consists of or is impregnated with insulating material (such as rubber, or a mixture of rubber and styrene), which is soluble in the aforesaid lacquer so that it tends to swell under the action of the lacquer and thus makes close contact with the cable conductor and the styrenated paper sleeve. The tape may consist of rubber or rubber styrene, or may consist of fibrous material (e. g. paper or textile) wholly or superficially impregnated with rubber or rubber styrene. Acetylated cotton tape impregnated with rubber styrene is very suitable.

The completed built-up insulation 6 is then thickly coated with the aforesaid lacquer and the sleeve 15 is driven into position centrally over the ferrule 5. Two similar halves 18 and 19 of a split sleeve of bonded styrenated paper are then fitted over the built-up insulation 6 on one side of the sleeve 15 and are likewise bound together by turns 20 of copper wire. Two halves 21, 22 of a second split sleeve of bonded styrenated paper are then fitted over the built up insulation on the other side of the sleeve 15 and are bound together by turns of copper wire 23.

Wrappings 11 of a similar fibrous tape to that used for the built-up insulation 6 are applied to cover the junctions of the lead sheaths 9, 10 and the paper tapes 1, 2 and are followed by wrappings of metallised paper 12. The inner sleeves 15, 18, 19, 21, 22 are then coated with the aforesaid lacquer, and the outer sleeves 16, 17 are then slid into position centrally over the joint. The end spaces inside the copper sleeve 17 are then filled with lead plugs 13, and the ends of the copper sleeve are plumbed to the lead sheaths 9, 10 by the wiped joints 14.

The bonded styrenated paper sleeves are preformed at the factory so that the time required for forming the joint at the site is substantially reduced whilst the method of applying the built-up insulation and the sleeves produces a barrier which is firmly bonded to the cable conductor and to the sleeves and is capable of withstanding very high oil pressures.

By the use of split insulating sleeves it is possible in a somewhat similar manner to form a barrier at any point in a cable irrespective of whether the cable is jointed at that point or not.

Fig. 2 shows a barrier termination which may be prepared by the following procedure. Parts similar to those of Fig. 1 are designated by the same reference numerals plus the suffix a. The lead sheath 10a is stripped from the cable end for the required length and the impregnated paper tape 2a is then removed for a short distance from the end and the exposed end of the tape 2a may then be bound with copper wire to hold the tapes in position while the termination is being prepared. This copper wire is not shown in the drawings, as it is removed before completing the termination. A copper end ferrule 5a is then soldered to the conductor 4a. Any free oil is wiped from the surfaces of 2a, 5a, which are then painted with a suitable lacquer, e. g. a lacquer consisting of polystyrene dissolved in monostyrene, with or without the addition of a suitable plasticizer. The surfaces of 2a, 4a and 5a are then lapped with insulating tape to form a built-up insulation 6a having a uniform diameter which is a tight fit inside a preformed styrenated paper sleeve 15a. This tape consists of or is impregnated with insulating material (such as rubber, or a mixture of rubber and styrene), which is soluble in the aforesaid lacquer so that it tends to swell under the action of the lacquer and thus makes close contact with the cable conductor and the styrenated paper sleeve. The tape may consist of rubber or rubber styrene, or may consist of fibrous material (e. g. paper or textile) wholly or superficially impregnated with rubber or rubber styrene. Acetylated cotton tape impregnated with rubber styrene is very suitable.

The completed built-up insulation 6a is then thickly coated with the aforesaid lacquer and the preformed sleeve 15a is driven into position. The cylindrical body of the sleeve 15a is provided with copper end caps 25, 26 and 27, 28 securely fastened to the insulating cylinder. Each of these caps comprises an inner cylinder 25, 27 and a somewhat shorter outer cylinder 26, 28 which is bent over to envelope the end of the sleeve 15a and engage the inner sleeve 25, 27. The end cap adjacent the lead sheath 10a is secured thereto by the wiped joint 14a. The projecting end of the inner cylinder 25 of the end cap adjacent the ferrule 5a is bent inwardly to envelope the end of the built-up insulation 6a and a copper and asbestos washer 29. The built-up insulation 6a continues to swell after the sleeve 15a has been driven into position, with the result that the space between the ferrule 5a, conductor 4a, and insulation 2a on the one hand, and the sleeve 15a on the other hand, is completely filled with an insulating barrier which forms a firm bond with the surfaces with which it is in contact, and at the same time is insoluble in the cable impregnating compound, so that the formation of voids is prevented.

The use of the preformed sleeve 15a has the advantage of reducing the time required for forming the termination whilst the method of applying the built-up insulation 6a produces a barrier which is capable of withstanding very high oil pressures and thus prevents the flow of oil or other compound out of or into the cable.

A common method of terminating an impregnated paper insulated power cable is to secure around a termination formed at the end of the cable a hollow porcelain insulator having an internal diameter which is considerably greater than the external diameter of the cable, the space within the insulator being filled with oil (or other insulating compound) except for a small space which is allowed for expansion of the oil or compound. In prior terminations employing a hollow insulator filled with oil there is the danger that when the cable run is below the termination, the oil in the porcelain insulator may flow downwards into the cable and leave a portion of the cable end exposed and therefore liable to damage by tracking; and that when the cable run is above the termination, oil may flow downwards from the cable into the porcelain insulator and on expansion during subsequent heating the oil may leak out of or even crack the insulator. This danger is overcome by the use of the barrier in accordance with the invention.

Figure 3:
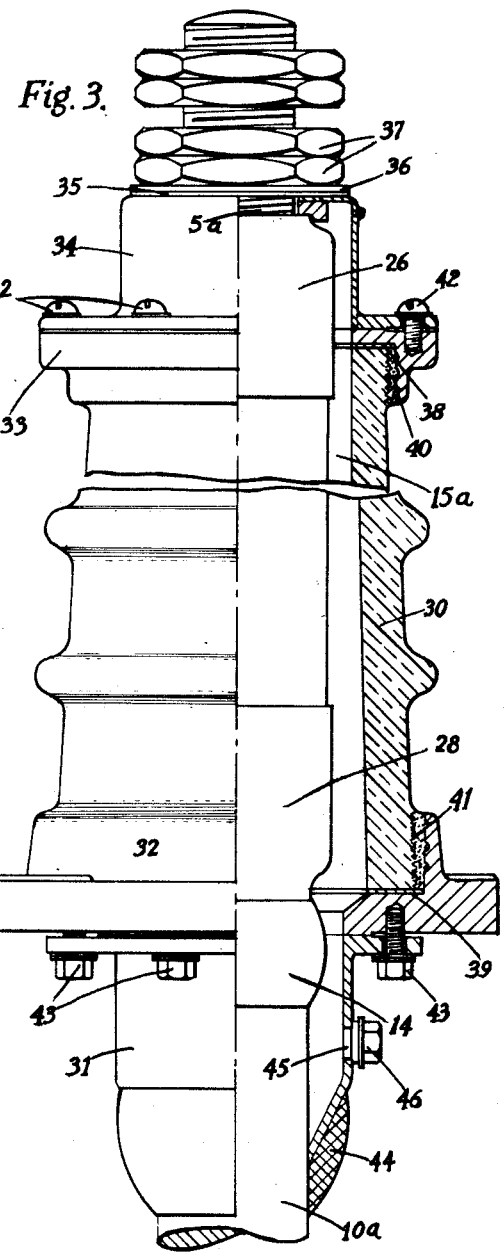

Fig. 3 shows the termination of Fig. 2 fitted inside a hollow porcelain insulator 30. Prior to the formation of the termination, the brass gland 31 is slipped over the cable end. When the termination has been completed it is passed through the metal base 32, the hollow porcelain insulator 30 and the metal clamping ring 33, the screwed end of the ferrule 5a being passed through an opening at the top of a brass dome 34 where it is secured in position by a sealing washer 35, brass washer 36 and nuts 37. Resilient washers 38, 39 are provided between the ends of the hollow porcelain insulator 30 and the metal clamping ring 33 and metal base 32, these latter being cemented to the insulator 30 by cement fillings 40, 41. The metal clamping ring is secured to the brass dome by screws 42 and the brass gland 31 is then secured to the metal base 32 by screws 43, the brass gland 31 being then united to the lead sheath 10a by a wiped joint 44. The space within the insulator 30 may then be filled with oil or other insulating compound, except for a small expansion space, via the filling aperture 45 which is normally closed by the filling plug 46.

What is claimed is:

1. A method of forming a barrier in an electric power cable having a conductor within a sheath which comprises lapping insulating tape around the conductor to form a varrier of built-up insulation having a uniform diameter coating the built-up insulation with a lacquer which has the property of causing said insulation to swell, and then applying a preformed sleeve into close contact with the built-up insulation so that said insulation upon swelling will tightly engage said sleeve.

2. A method of forming a barrier joint between two sections of an electric power cable each section having a conductor within a sheath, which comprises bringing together the ends of the conductor which are to be joined, building up a body of insulation around the joint by successive layers of tape around the joined conductors containing rubber styrene until it has a uniform diameter which is substantially equal to the internal diameter of a pre-formed sleeve, coating the built-up insulation with a solvent for the rubber or rubber styrene, and then driving said preformed sleeve over the built-up insulation so that said insulation upon swelling will tightly engage said sleeve.

3. A method of forming a barrier termination for an electric power cable having a conductor within a sheath, which comprises joining the conductor to a ferrule, building up a body of insulation around the end of the ferrule adjacent to said conductor, said conductor and the adjacent cable insulation, by successive layers of tape containing rubber styrene until it has a uniform diameter which is substantially equal to the internal diameter of a pre-formed sleeve, coating the built-up insulation with a solvent for the rubber styrene, and then driving said preformed sleeve over the built-up insulation so that said insulation upon swelling will tightly engage said sleeve.

4. The method of forming a barrier in an electric power cable having a conductor within a sheath, which comprises lapping insulating tape around the conductor to form a barrier of built-up insulation, coating the built-up insulation with a lacquer which has the property of causing said insulation to swell, and then placing said built-up lacquered insulation within a close-fitting sleeve, and placing said sleeve within an outer sleeve strong enough to prevent deformation when the insulation swells.

5. The method of forming a barrier in an electric power cable having a conductor within a sheath, which comprises lapping insulating tape around the conductor to form a barrier of built-up insulation containing a substance which swells when brought into contact with a lacquer, coating the tape with a lacquer which has the property of causing it to swell, and then placing said lacquered insulation within a sleeve which is rigidly secured against deformation upon the swelling.

6. In an electric cable having a conductor within a sheath, a cable barrier comprising a rigid sleeve, a built-up mass of insulating tape around the conductor and swollen within the sleeve, and restraining means for holding said sleeve against the pressure from said swollen insulation within it.

7. In an electric cable having a conductor and a sheath, said conductor being partly covered and partly uncovered by insulation within the sheath, a cable carrier comprising a built-up mass of insulating tape around the conductor and around the insulation within the sheath, means for swelling the mass, a sleeve closely fitted over said mass and another sleeve fitted around the first-mentioned sleeve to hold the first-mentioned sleeve against pressure from said swollen mass.

8. In an electric cable having a conductor within a sheath, said conductor being partly covered and partly uncovered by insulation within the sheath, a cable barrier comprising a rigid sleeve, a mass of insulation around the conductor and swollen between the sleeve and the conductor, a second sleeve closely fitted around the first-mentioned sleeve and a metallic sleeve around the second sleeve and joined to the cable sheath.

EDWIN CHARLES LEE.